No. 875,181. PATENTED DEC. 31, 1907.
H. V. JOHNSON.
LIQUID MEASURING DEVICE.
APPLICATION FILED DEC. 10, 1906.
2 SHEETS—SHEET 1.
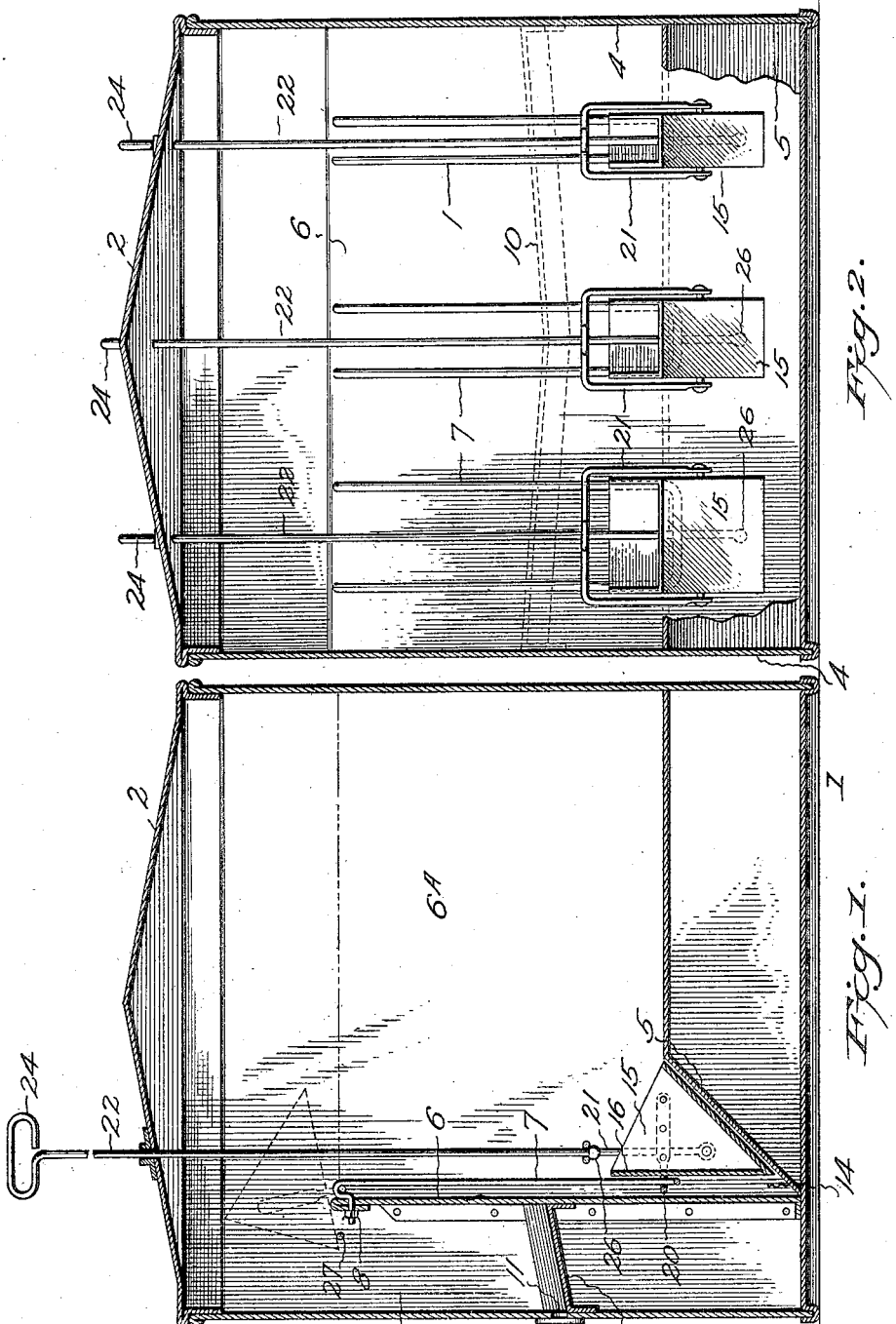

No. 875,181.　　　　　　　　　　　　　　PATENTED DEC. 31, 1907.
H. V. JOHNSON.
LIQUID MEASURING DEVICE.
APPLICATION FILED DEC. 10, 1906.
2 SHEETS—SHEET 2.
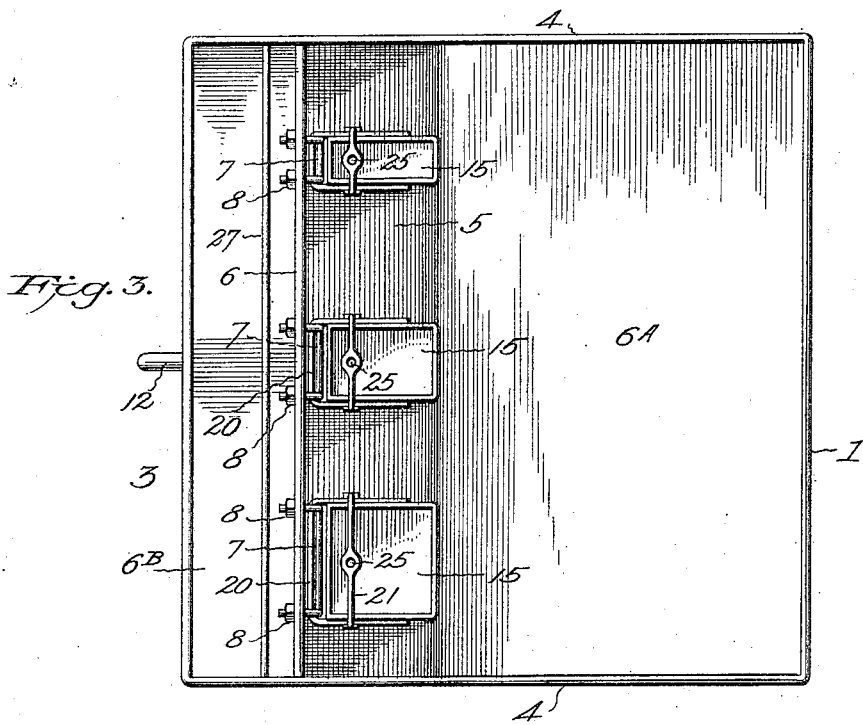
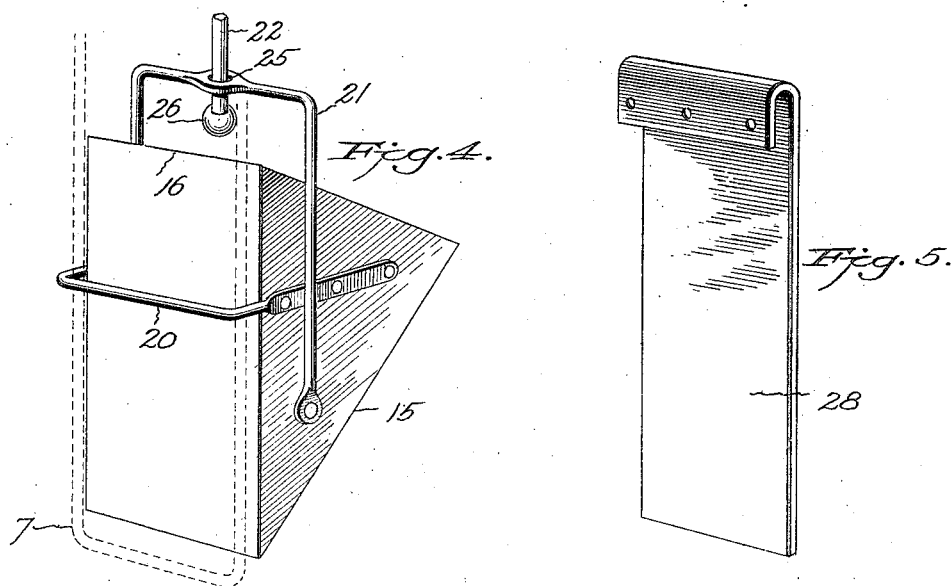
Witnesses:
G. Sargent Elliott
Adella M. Fowle
Inventor:
Henry V. Johnson.
By H. S. Bailey, Attorney

UNITED STATES PATENT OFFICE.

HENRY V. JOHNSON, OF DENVER, COLORADO.

LIQUID-MEASURING DEVICE.

No. 875,181.  Specification of Letters Patent.  Patented Dec. 31, 1907.

Application filed December 10, 1906. Serial No. 347,176.

*To all whom it may concern:*

Be it known that I, HENRY V. JOHNSON, a citizen of the United States of America, residing at the city and county of Denver and State of Colorado, have invented a new and useful Liquid-Measuring Device, of which the following is a specification.

My invention relates to improvements in liquid measuring machines, and the objects of my invention are: first, to provide a custom liquid measuring machine by which storekeepers can vend liquids in accurately measured quantities of a pint or quart or a gallon or other quantity. Second, to provide a reliable liquid measuring machine that is adapted to be placed either on the counters or floors of stores in full view of customers, and from which liquids may be sold and dispensed from automatically filling and discharging dippers or buckets of fixed predetermined capacity, such as a pint or quart or a gallon dipper. And third, to provide a simple, inexpensive, and reliable liquid measuring machine that is adapted to the custom trade of grocery stores, for vending vinegar, milk, cream, oils and other liquids, in fixed, accurate amounts of pints, quarts, gallons, or other predetermined amounts. I attain these results by the mechanism illustrated in the accompanying drawings, in which:

Figure 1, is a sectional side elevation through a measuring machine embodying my invention. Fig. 2, is a sectional front elevation of a measuring machine, containing a plurality of liquid holding dippers. Fig. 3, is a plan view of Fig. 2, the cover being removed. Fig. 4, is a perspective view of one of the liquid measuring dippers. And Fig. 5, is a perspective view of a modified form of the dipper guide.

Similar letters of reference refer to similar parts throughout the several views.

Referring to the drawings, the numeral 1, designates a tank of any practical shape, but preferably a tank of rectangular shape is used. This tank is provided with a cover 2, which is preferably arranged to fit snugly but removably over the top of the tank, but may be hinged thereto, if desired.
The tank and its cover may be made of any suitable material, such as tin, aluminium, galvanized iron, porcelain, or earthen-ware, iron-ware, or iron coated or lined with porcelain, glass, rubber, wood fiber, or any other suitable material. I preferably make this tank so that a portion of its front or discharging end 3, extends to its floor or bottom portion, and arrange the remainder of the floor or bottom portion of the tank above the floor of the forward portion of the tank a distance equal substantially to the depth of the liquid measuring dipper or bucket, by which the liquid is measured, as will be explained more fully hereinafter; but along the sides of this higher bottom portion of the tank I continue the opposite sides 4 of the tank, down to the level and even with the bottom of the front part of the tank. These two bottom portions of the tank are connected together by an angular floor portion 5, extending from the raised to the rear end of the lower portion, and from the junction of this angular portion 5, and the lower floor portion of the tank, I form a vertical partition 6, across the interior of the tank from side to side, and I extend this partition up vertically into the tank to within a distance of its top edge equal to preferably the same distance from the top edge of the tank that the raised floor portion of the tank is above the lower floor portion of the tank. This partition divides the tank into a liquid holding compartment 6$^A$, and a liquid discharging compartment 6$^B$. From the top edge of this partition, I extend down the side of the partition guideways 7, which extend down the sides of the partition and at a short space from it. These guideways are preferably formed by rods which are secured to the top of the partition, but if desired they may be formed of a portion of the partition curved over and bent back upon itself, and arranged to depend downward from it and parallel with it. I preferably use however, rods which are bent in the form of the letter U, the free ends of which are removably secured to the top of the partition by being bent at right angles to extend through the partition 6, the bent ends being threaded to receive nuts 8, as shown in Figs. 1 and 3.

Between the partition and the front side of the tank, I form a discharge trough 10, which extends to and connects with a discharge outlet 11, around which a discharge spout 12, is formed, to the end of which a drip cup 13 is connected in such a manner as to be pushed aside when the liquid is being discharged from the spout into a pail or other receptacle designed to receive it.

The triangular space 14 formed between the vertical partition and the inclined portion of the bottom of the tank, comprises the dipping pocket or space, and extends entirely across the tank. In this dipping pocket normally rests a plurality of liquid dippers or buckets 15, which are also of triangular shape, and extend down practically to its bottom, the upper edge of the rear side of the bucket being on a level with the raised portion of the floor of the tank. A discharge spout is formed on each bucket by extending its front side above its rear side, and connecting the sides by triangular ends, as shown. The front sides of the buckets stand vertical in the angular dipping space of the liquid compartment of the tank and close to the partition and against or very close to the guideway rods 7, and to the opposite ends of the buckets I secure the opposite ends of looped strips or rods 20, which form slideways which extend across the front sides of the dippers and extend beyond them far enough to allow the guide-rods 8 to pass between this looped rod 20 and the front side of the bucket; consequently the bucket is connected to and slides up and down on these guide rods, or if desired the guide rods may be of such a length that when the bucket is resting on the bottom of the angular dipping pocket the rods will extend just to the top of the loop 20, so that when it is desired to remove the bucket from the tank it will only be necessary to spring the lower ends of these rods towards the partition enough to allow the dipper to be lifted by and clear of them.

To the sides of the dippers I pivotally connect bails 21, which are positioned at a point that will throw the weight of the dipper and its liquid contents against the guide rods, and centrally to the top of this bail I secure a hand operating rod 22, which extends up through an aperture formed in the cover, and to its upper end a grasping handle 24 is formed. The bucket is raised by this handle, and the top ends of the guide rods are extended enough above the top of the partition to permit the dipper to tilt over the edge of the partition when the dipper is raised to the top of the guide rods, the tilting being accomplished by the engagement of the loops 20, with the upper ends of the guideways 8, as shown in dotted lines, Fig. 1. The tank is filled with any merchandise liquid, such as vinegar, milk, cream, or oil to close to the top of the partition, and the liquid holding compartment, and the top entrance to the bucket is arranged to stand even with or slightly below the level of the raised floor of the tank; consequently the dippers will drain the tank of its contents.

I preferably make a loose connection between the bail and the handle, in order to provide means by which the dipper may be forced down through the liquid into its triangular dip pocket if necessary, and I preferably carry out this feature of my invention in the following manner: I form an aperture 25 in the center of the top of the bail, and extend the lower end of the handle loosely through it, and form on the lower end of the handle or attach to it, a knob 26, which is larger than the aperture in the bail; when the handle is raised the knob will strike the under side of the bail and will raise the bucket, but when the handle is pushed down, it will slide through the bail against the bottom of the inside of the bucket, and the bucket can be pushed down under the liquid more speedily than it will sink naturally.

My invention contemplates a tank provided with a liquid holding compartment, provided with dippers of fixed predetermined different capacities, suitable for the custom vending of family consumably liquids, as shown in Figs. 2 and 3, in which a tank is illustrated with one compartment, and with three dippers, one of which is arranged to hold a pint, another a quart, and a third a gallon.

The operation of my improved liquid measuring device is as follows: The tank is adapted to be placed on a floor or counter in full view of customers, and when desired a general supply barrel or tank may be supported above it, and arranged so that the liquid measuring tank may be filled readily when about empty. When it is desired to draw a dipper full of liquid which bucket will always measure some usually custom sold quantity, such as a pint, quart, or gallon, the store-keeper inserts the customer's pail under the discharge spout and moves the drip cup to one side, the drip cup being pivotally secured to the discharge spout so as to normally hang beneath the same in position to catch the drippings from the spout. He then grasps the handle and raises the bucket through the liquid, and the bucket travels up the guide-rods to the top ends, when the loop 20 engages the upper ends of the guide, and the bucket swings over the apron and empties its contents into the discharge trough compartment 6$^B$, and onto the discharge trough, from which it runs into the pail. A stop rod 27 is placed across the tank to prevent the bucket being tilted too far. After the contents of the bucket have run out, the dipper is lowered through the liquid into its pocket, and the drip cup is placed under the spout.

In Fig. 5, I have shown a modification of the bucket guide, in which a metal piece 28 is employed, the upper end of which is curved or bent over, and secured to the upper end of the partition.

The dipper can be worked quite rapidly to supply liquid to customers, and with a certainty of full, even, and accurate measure to each dipper-full.

Having described my invention, what I claim as new and desire to secure by Letters Patent, is:

1. In a liquid measuring machine, a tank having a liquid holding compartment extending from near its bottom to near its top, and a discharging compartment containing a discharge spout at one side of said liquid holding compartment, a partition separating said liquid holding compartment from said discharging compartment, a dipper guide-way in said liquid compartment along said partition arranged to extend above said partition, a bucket in said liquid compartment connected to said guide-way, a bail and hand operating rod pivotally connected to said dipper to cause it to over-balance towards said guide-way and partition, said guide-way being arranged to permit said dipper to tilt over the top edge of said partition when lifted to the top of said guide-way by said hand operating rod.

2. In a liquid measuring machine, the combination of a tank provided with a discharging compartment and with a liquid compartment separated from said discharging compartment by a partition, the front portion of said liquid compartment being deeper than the other portion, said partition being arranged vertically across said tank from its deepest part to a predetermined distance from its top and adapted to form a liquid holding compartment in said tank, a dipper arranged to stand normally in the deeper portion of said tank, a dipper guide-way connected to the upper end of said partition, a slide-way on said dipper adapted to fit over said guide-way, a bail pivotally connected to said dipper in a position to over-balance it to lean against said guide-way and towards said partition, a hand operating rod slidably mounted in said bail to bear against the bottom of said dipper when pushed downward, and adapted to engage said bail and raise said dipper when lifted upward, said guide-way being extended far enough above said partition to permit said bucket to be lifted far enough above said partition to tilt over it into said discharging compartment, a cover to said tank, and a guide-way through said cover for said hand operating rod.

3. In a liquid measuring machine, the combination with the tank, provided with the liquid holding and the discharge compartments and provided with a dipper pocket, of the dipper fitting in said pocket, the partition extending between said liquid holding compartment and said discharge compartment, the hand operating rod journaled to said dipper to over-balance said dipper against said partition, the cover upon said tank, having a guide aperture through which said rod extends, a loop slide-way on said bucket, a U-shaped guide-way connected to the upper end of said partition and extending down parallel with said partition and at a short distance from it and extending into said dipper's slide-way, the upper end of each member of the guide-way being curved and extended far enough above said partition to allow said dipper to tilt over the edge of said partition and discharge into said discharge compartment.

4. In a liquid measuring machine, the combination of a tank having a floor portion arranged in two planes and an angular floor portion connecting the two floor portions, a vertical partition extending up into said tank and across the same from the junction of the lower end of said angular floor portion with the lower floor portion of said tank, to within a predetermined distance from the top of said tank, and extending across said tank, and adapted to form a liquid holding compartment, said angular shaped recess in the floor of said liquid holding compartment being adapted to form a liquid dip pocket, a triangular shaped dipper adapted to fit into and rest normally in said dip pocket at the bottom of said partition, and provided with a discharge spout, a guide-way on said partition, a slide-way on said dipper connected to said partition's guide-way, means including a manually operated rod for lifting said dipper, means connected with said partition's guide-way for tilting said dipper over the upper edge of said partition when said dipper is lifted to the top of said partition, a liquid discharging compartment in said tank on the opposite side of said partition from said liquid compartment, a stop arranged to define the tilting angle of said dipper, a discharge spout connected with said discharge compartment, a movable drip cup connected to said spout and a removable cover over said tank provided with a guide slot through which said hand operating rod extends.

5. A liquid measuring device, comprising a tank having a liquid holding compartment, and a discharge compartment separated by a partition, the floor of said liquid compartment being constructed to form a triangular pocket adjacent to the partition;

a plurality of U-shaped guides, the free ends of which are curved and secured to the upper end of the partition; a plurality of triangular buckets in said pocket, having loops on their front sides through which the U-shaped guides pass; a bail on each of said buckets; lift rods having a vertical sliding movement in the horizontal member of said bails, and provided with knobs upon their lower ends; said loops on said buckets, being adapted to engage the curved upper ends of the guides, when the buckets reach the limit of their upward movement, and tilt therein.

In testimony whereof I affix my signature in presence of two witnesses.

HENRY V. JOHNSON.

Witnesses:
    G. SARGENT ELLIOTT,
    ADELLA M. FOWLE.